Sept. 4, 1951      E. L. MAGER      2,566,349
ELECTROLUMINESCENT LAMP
Filed Jan. 28, 1950
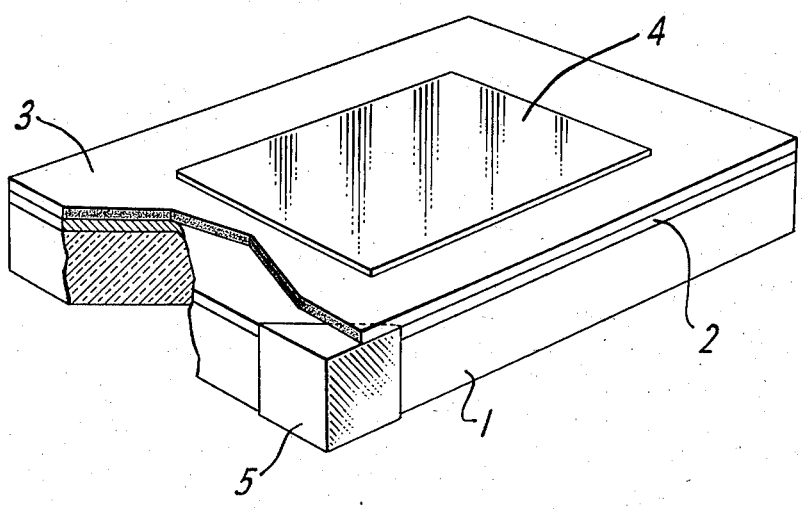
INVENTOR
ERIC L. MAGER
BY *Laurence Burns,*
ATTORNEY Patented Sept. 4, 1951

2,566,349

UNITED STATES PATENT OFFICE 2,566,349

ELECTROLUMINESCENT LAMP

Eric L. Mager, Peabody, Mass., assignor to Sylvania Electric Products Inc., Salem, Mass., a corporation of Massachusetts Application January 28, 1950, Serial No. 141,050

5 Claims. (Cl. 313—358)

This invention relates to electroluminescent lamps and methods of making them.

In an electroluminescent lamp light is obtained by the direct application of voltage across a phosphor or by placing the phosphor in an electric field. It differs from the usual fluorescent lamp in which the voltage or field is placed across a gas and the radiation from the gas used to excite a phosphor. In the electroluminescent lamp the light appears to be produced only when the voltage is applied and when it is removed, or when the voltage is changed. Such lamps are accordingly most effective when used on alternating, pulsating or otherwise varying currents.

The lamp of my invention may comprise a phosphor placed between two conductors across which a voltage may be applied, and in the present invention the phosphor is embedded in an insulating dielectric material. The embedded phosphor layer may be compressed between a light-transmitting conducting material such as so-called conducting glass, and a metallic backing layer preferably of good reflectivity, although a transparent conductive backing layer may be used if desired.

I have found that the presence of acid in the insulating dielectric material deleteriously affects the useful life of the device, presumably by some reaction on the phosphor. The most common dielectric materials in which the phosphor may be embedded are generally acidic, but I have found that the addition of a suitable basic material to neutralize the acid greatly increases the useful life of the lamp.

Such a device is adaptable to mass production methods and the final unit is easily handled and simply connected to the usual 110-volt lighting line, for example, although higher voltages are often preferable for increased brightness.

Additional features, objects and advantages of the invention will be apparent from the following description, taken with the accompanying figure, which shows a perspective view, partly cut away, of a device according to the invention.

In the figure, the glass plate 1 has the transparent conductive coating 2 on one side thereof. Such coatings are known in the art, and may be applied, for example, by exposing the heated glass to vapors of silicon, tin or titanium chlorides, and afterwards placing it in a slightly reducing atmosphere. In some cases, stannic chloride may be mixed with absolute alcohol and glacial acetic acid and the glass plate to be coated dipped into it, if the application by vapors is not convenient.

Whether applied by vapor, dipping or otherwise, the resulting coating appears to contain stannic (or silicic or titanic) oxide, probably to some extent at least reduced to a form lower than the dioxide, although the exact composition is not fully known.

A phosphor coating 3 is placed over the conductive coating 2. The phosphor may be any material which will luminesce under the influence of an electric field, for example a fired mixture of zinc sulphide and oxide, activated by halogen and copper and lead, or a phosphor such as described in the copending application of Elmer C. Payne, Serial No. 105,803, filed July 20, 1949, which shows a phosphor made by firing a powdered mixture of 75% zinc sulphide and 25% zinc oxide by weight, with small activating amounts of lead, copper, and halide, the firing being done at between 900° C. and 1250° C. in an atmosphere of inert gas.

The phosphor is generally mixed, in finely-powdered form, with a material of high resistivity and high dielectric constant. This prevents flash over in what would otherwise be the spaces between the phosphor particles, and has other advantages as well.

I prefer to embed the phosphor particles in a solid or semi-solid dielectric material of reasonable light-transmitting properties, such as a suitable solidified oil, wax, resin, plastic or similar material, preferably of good dielectric strength, low power loss, and high dielectric constant. Nitrocellulose plasticized with castor oil, camphor, dioctyl phthalate or the like has proven very effective.

The phosphor may be suspended in a solid dielectric sheet of relatively uniform thickness, for example by methods well known in the art for incorporating pigments into transparent or translucent plastics and forming sheets of such materials. Such a sheet is sandwiched in between the conductive coating 2 and the metal sheet 4, and air is eliminated by squeezing the plates 2 and 4 together, with or without the usual vacuum techniques for the elimination of air. This solid dielectric eliminates the need for any edge seal to retain oil, which is not present in liquid form in this construction.

In one embodiment of my invention, I made a suspension of the phosphor as follows:

2 cc. chlorinated diphenyl
2 cc. dioctyl phthalate
4 cc. castor oil
2 g. sodium bicarbonate
10 g. phosphor (finely-powdered)

2 g. ethyl cellulose
29 cc. xylol
1 cc. n-butanol
35 cc. butyl acetate
50 cc. chloroform
20 cc. anhydrous alcohol In making the suspension, the ethyl cellulose was dissolved in a mixture of part of the xylol (about 24 cc.) and all of the butanol (1 cc.) to form about 26 cc. of an ethyl cellulose lacquer was then added to the rest of the mixture.

The mixture was then sprayed onto the conducting surface of the glass plate 1 with a spray gun of a type usual in the art. The coating is then air-dried or if desired, oven-dried, and on its exposed surface a thin layer of metal, for example aluminum, is deposited by the usual vacuum evaporation methods or by some other convenient method.

The phosphor used may be, for example, the zinc oxide-sulfide phosphor previously described herein, or some other suitable phosphor.

Although in the example above I have used sodium bicarbonate as the acid-neutralizing agent, any other neutralizing agent may be used that does not have a deleterious effect on the phosphor or on the embedding medium. The amount of acid-neutralizing material may be varied, as long as it is sufficient to neutralize the acidity and insufficient to harm the materials used in the lamp.

The thicknesses of the various layers may be altered to suit various voltage conditions and the like, but I have found a conducting coating 2 may have a thickness of about a wavelength of light, producing an iridescent effect when viewed at an angle, and a phosphor layer 3 of about 2 one thousandths of an inch, and a metal layer 4 of a fraction of a thousandth of an inch, to be satisfactory. The plate 1 may have any convenient thickness, and although I have mentioned it as being of glass, it may be of other transparent material, such as plastic, if desired, provided of course that the material is conducting, or can carry a conductive coating 2.

In operation, a voltage, preferably alternating, is applied between the metal tab 5 (connected to conducting coating 2), and the metal layer 4.

The voltage necessarily will depend on the phosphor used, the thickness of the phosphor layer 3, and the brightness desired, but voltages between 25 volts and 2500 volts and even higher have been used. Lamps, according to my invention, operating directly from the usual 110 volt line, with no transformers or auxiliary equipment necessary, have been made.

The plate 1 may, of course, be translucent instead of transparent, if desired.

A light-transmitting conductive plastic may be used if desired.

What I claim is:

1. An electroluminescent lamp comprising a light-transmitting electrically-conductive layer, a layer thereover of a field-responsive phosphor in a light-transmitting non-acidic insulating dielectric material, and an electrically-conductive layer thereover.

2. An electroluminescent lamp comprising a light-transmitting electrically-conductive layer, a layer thereover of a field-responsive phosphor in a light-transmitting acid-neutralized insulating dielectric material, and an electrically-conductive layer thereover.

3. An electroluminescent lamp comprising a light-transmitting electrically-conductive layer, a layer thereover of a field-responsive phosphor in a light-transmitting insulating dielectric material containing an acid-neutralizing material, and an electrically-conductive layer thereover.

4. An electroluminescent lamp comprising a light-transmitting electrically-conductive layer, a layer thereover of a field-responsive phosphor in a light-transmitting insulating dielectric material containing an alkaline material, and an electrically-conductive layer thereover.

5. An electroluminescent lamp comprising a light-transmitting electrically conductive layer, a layer thereover of a field responsive phosphor in a light-transmitting, non-acidic insulating dielectric solid material, and an electrically conductive metal layer thereover.

ERIC L. MAGER.

REFERENCES CITED

The following references are of record in the file of this patent:

UNITED STATES PATENTS

| Number | Name | Date |
| --- | --- | --- |
| 2,155,509 | Schroter | Apr. 25, 1939 |
| 2,254,957 | Bay et al. | Sept. 2, 1941 |